Nov. 13, 1934.   W. L. MONRO   1,980,970

LAMINATED GLASS

Filed Dec. 18, 1933

INVENTOR

Patented Nov. 13, 1934

1,980,970

UNITED STATES PATENT OFFICE 1,980,970

LAMINATED GLASS

William L. Monro, Pittsburgh, Pa.

Application December 18, 1933, Serial No. 702,878

7 Claims. (Cl. 49—92)

This invention relates to laminated glass and the manufacture thereof, and provides a new and useful product which is superior in many respects to those known at the present time.

Laminated or strengthened glass has been heretofore manufactured by various processes and by the use of various materials as the strengthening medium to be interposed between the glass sheets and rigidly united thereto. Cellulose composition materials, such as cellulose nitrate and cellulose acetate, have been used extensively as the strengthening material and have been united to the glass sheets by various processes. It has also been proposed to use various types of synthetic resins as the strengthening material to be interposed between the glass sheets. The present invention does not relate to the strengthening material to be interposed between the glass sheets, nor to the process whereby a satisfactory union is obtained between the glass sheets and the strengthening material. It is not limited to the use of any particular strengthening material or to any particular process of obtaining a union between the component parts, although hereinafter one method of manufacturing the product which I provide will be described.

The present invention is concerned with the combination of glass sheets of certain characteristics, whereby a quality product may be obtained at low cost and with certain structural advantages not heretofore obtainable.

The present requirements for laminated glass are exceedingly high, as it is used primarily in automobile windshields and side windows, airplane windows and windows of various other types of vehicles. The windows of such vehicles, and particularly windshields therein, must transmit light without an appreciable amount of distortion. For this reason, it has heretofore been the general practice to use nothing but plate glass in making up the windshields. Plate glass, as is well known, is produced by a rolling operation so that the faces thereof are roughened or marred and require grinding and polishing. In order to obtain satisfactory plate glass, it is necessary to grind and polish both faces thereof. This polishing is obtained in various different manners. The resulting glass, by reason of the grinding and polishing, is given a flat true surface. Such sheets are usually optically true and do not present a wavy appearance with resultant distortion, as does drawn glass. However, the cost of manufacturing plate glass is considerably greater than the cost of manufacturing drawn glass and it is, therefore, desirable to use drawn glass wherever possible instead of plate glass. In addition to the cost factor, it is desirable to use drawn glass for various other reasons to be pointed out hereinafter.

Drawn glass is produced by a drawing operation either in the form of cylinders which are flattened and cut up, or in the form of a continuous sheet. This form of glass has a highly desirable natural fire finish or polish so that it requires no mechanical surfacing whatever as does plate glass. Drawn glass, however, has the disadvantage that the surfaces are wavy or undulatory and, therefore, not optically true, although a high polish or finish is present. Ordinarily when drawn glass is viewed at an angle, the surface presents a wavy appearance with reflected light, and when used in glazing there is distortion in the appearance of objects viewed through it. It has heretofore been proposed to unite two sheets of ordinary drawn glass with a layer of strengthening material interposed between them, but such a product has not been deemed satisfactory in view of the fact that considerable distortion is caused by the undulatory surfaces of the glass sheets. Consequently, plate glass has been heretofore used principally in the manufacture of commercial laminated glass.

I have found that a highly desirable product can be obtained by uniting one sheet of drawn glass having fire polished faces with a sheet of drawn glass having one face fire polished and the other face ground and polished, the ground and polished surface of the one sheet of drawn glass being placed outwardly; that is, the fire polished face of the last mentioned sheet is turned inwardly adjacent the strengthening material interposed between the glass sheets.

I have found that a product of this character has a quality equal for all practical purposes to the more expensive types of laminated glass including ground and polished plate glass, despite the fact that the one sheet of drawn glass has all of its characteristic wave and the other sheet has one face thereof which has all of its characteristic wave. The product which I provide eliminates the wavy appearance obtained when two sheets of ordinary window glass are united together with a layer of strengthening material interposed therebetween.

There are other important advantages in the present invention. The product which I provide is highly desirable from the standpoint of transmission of light. It is less absorptive than in the case of laminated glass made from two pieces of ground and polished plate glass.

It is also possible by my invention to make a much thinner sandwich than can be made from plate glass on a commercial scale. It is difficult to form a very thin plate glass blank and the problem of grinding increases the thinner the glass is ground. Difficulty is encountered in that the glass sometimes becomes wedge-shaped or does not have the two sides perfectly plane so that it is difficult to grind to the desired thinness. Furthermore, it is desirable to have the glass sheet facing the interior of a vehicle relatively thin in order to minimize the spalling off of chips from the face opposite that which is likely to be struck by a stone or other missile.

Furthermore, by my invention it is possible to make sandwiches sufficiently thin that they can be substituted for the ground and polished sheets ordinarily employed in car windows and windshields. Where ground and polished sheets of plate glass are used, the minimum thickness obtainable is approximately—

| | Inch |
|---|---|
| Sheet of plate glass | .112 |
| Sheet of strengthening material | .020 |
| Sheet of plate glass | .112 |
| Total thickness of sandwich | .244 |

This is materially thicker than necessary from the standpoint of strength, and in fact makes the glass less safe, as pointed out above. In accordance with my invention, I may employ sheets of drawn glass having a thinness of .070 inch. This makes the thickness of the sandwich approximately—

| | Inch |
|---|---|
| Sheet of drawn glass | .070 |
| Sheet of strengthening material | .020 |
| Sheet of drawn glass | .070 |
| Total thickness of sandwich | .160 |

In accordance with my invention, I may also use as the one sheet of drawn glass having both of its faces fire polished, a sheet materially thinner than could possibly be ground and polished on either one or both faces. For example, I may employ a sheet having a thinness of .040 inch. This makes the thickness of the sandwich approximately—

| | Inch |
|---|---|
| Sheet of drawn glass | .070 |
| Sheet of strengthening material | .020 |
| Sheet of drawn glass | .040 |
| Total thickness of sandwich | .130 |

This product is sufficiently thin that it may be used as a substitute for ground and polished sheets of the thickness ordinarily employed for car windows and windshields. The quality thereof is also very high.

The present invention is also highly advantageous from the standpoint of cost.

In the accompanying drawing, I have shown for purposes of illustration only several embodiments of my invention.

In the drawing—

Figure 1:
Figure 1 is a sectional view showing a sheet of glass having a film of a strengthening material formed thereon before lamination.
Figure 2:
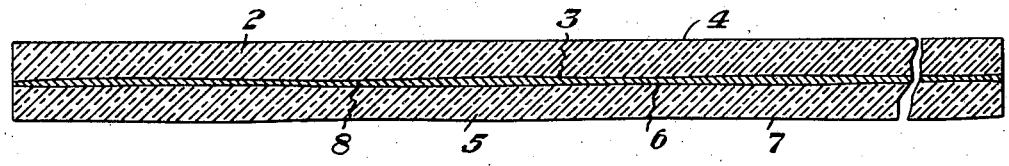
Figure 2 is a sectional view showing one embodiment of my invention.

In Figure 2, I have shown a sheet of laminated glass comprising a sheet 2 of drawn glass having its inner face 3 fire polished and its outer face 4 ground and polished. This sheet 2 is united to a sheet of drawn glass 5 having its inner face 6 and its outer face 7 fire polished. These sheets are rigidly united to a layer of strengthening material 8. As shown in this figure, the two sheets of glass may be of substantially the same thickness.

Figure 3:
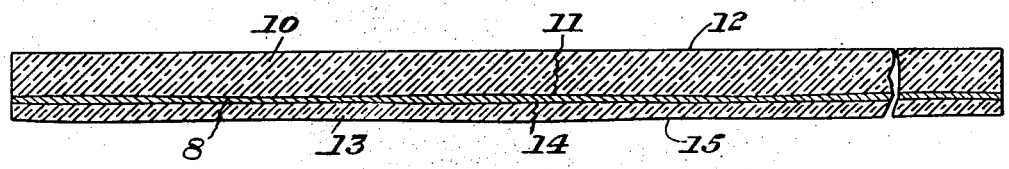
Figure 3 is a sectional view of a different embodiment of my invention.

In Figure 3, I have shown a different embodiment of my invention comprising a sheet of drawn glass 10 having its inner surface 11 fire polished and its outer surface 12 ground and polished. This sheet is united with a relatively thinner sheet 13 having both its inner surface 14 and its outer surface 15 fire polished. This sheet may be of any desired thinness. I have found that an entirely satisfactory product is obtained where a sheet of approximately .040 inches in thickness is used.

In carrying out my invention, I prefer to use a liquid plastic such as a solution of a polymerized acrylic acid ester as the strengthening material to be interposed between the two glass sheets. I prefer to form a film 16 of the liquid plastic on each of the glass sheets to be formed into the sandwich and to then unite the two sheets together. The film of strengthening material is preferably formed on the wavy face of the one sheet having one face thereof ground and polished.

After the film of strengthening material is formed on each of the two sheets to be united, the films are dried and the sheets united together with the filmed surfaces in juxtaposed relationship.

It will be understood that my invention is not limited to the use of a liquid plastic as the strengthening material and the formation of a film thereof on the glass sheets to be united. My invention may be utilized where a sheet of cellulose material, such as cellulose acetate or cellulose nitrate, for example, is interposed between the two glass sheets and united thereto by means of a suitable adhesive material.

The strengthening material used preferably has a refractive index substantially the same as that of the glass. This aids in the elimination of distortion attendant upon the use of sheets of glass having wavy surfaces. As a matter of fact, where a liquid plastic having a refractive index substantially the same as that of glass is used as the strengthening material, the inner wavy surfaces of the glass sheets have little or no tendency to cause distortion in the final product.

While I have shown and described several embodiments of my invention, it will be understood that I do not intend to be limited thereby, but that my invention may be otherwise embodied within the scope of the appended claims.

I claim:

1. As an article of manufacture, laminated glass comprising a sheet of drawn glass having fire polished faces and a sheet of drawn glass having one face thereof ground and polished, said sheets being cemented together.

2. As an article of manufacture, a sheet of laminated glass having one lamination thereof formed of a sheet of drawn glass having fire polished faces and having one lamination formed of a sheet of drawn glass having one face thereof ground and polished, the ground and polished face being turned outwardly.

3. As an article of manufacture, a sheet of laminated glass comprising a layer of drawn glass having fire polished faces, a layer of drawn glass having one face thereof ground and polished, and a layer of transparent strengthening material cementing the two layers of glass together.

4. As an article of manufacture, a sheet of laminated glass comprising a layer of drawn glass having fire polished faces and a layer of drawn glass having one face thereof ground and polished and the other face fire polished and united by a layer of non-shatterable material, the fire polished face of said last mentioned layer being united with the layer of non-shatterable material.

5. As an article of manufacture, laminated glass comprising a layer of glass having both of its faces fire polished, a sheet of non-shatterable material united with one face thereof, and a layer of drawn glass having one of its faces ground and polished and the other fire polished united with the other face of the sheet of non-shatterable material.

6. As an article of manufacture, a sheet of laminated glass comprising two sheets of drawn glass rigidly united together with a film of a non-shatterable strengthening material, one of said sheets having both of its faces fire polished and the other of said sheets having one face thereof ground and polished and the other face thereof fire polished, said first-mentioned sheet being appreciably thinner than said last-mentioned sheet.

7. As an article of manufacture, a sheet of laminated glass comprising a layer of drawn glass having both of its faces fire polished, and a sheet of drawn glass having one of its faces fire polished and one ground and polished, said first mentioned sheet being thinner than the last mentioned sheet, and the two layers being cemented together.

WILLIAM L. MONRO.